July 9, 1940.  L. E. LA BRIE  2,207,126
BRAKE
Filed July 12, 1935   2 Sheets-Sheet 1
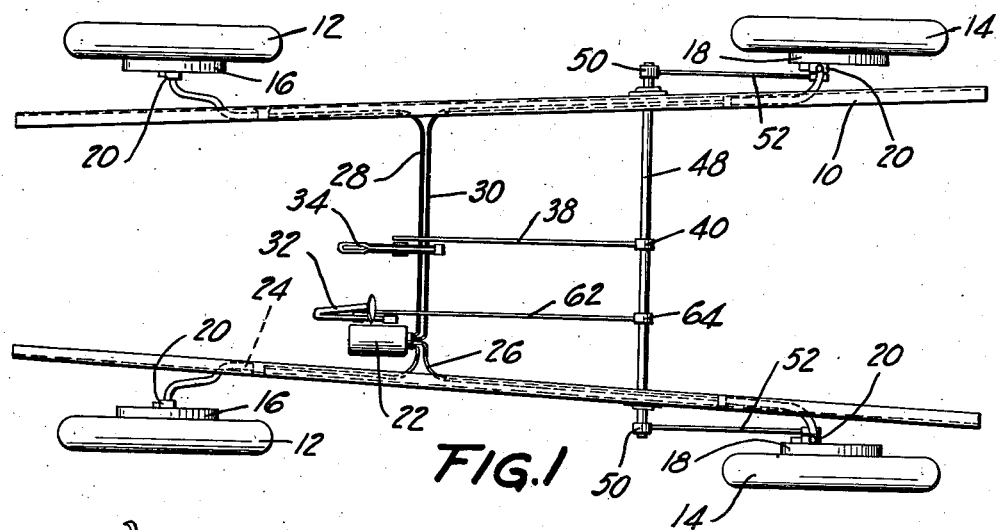
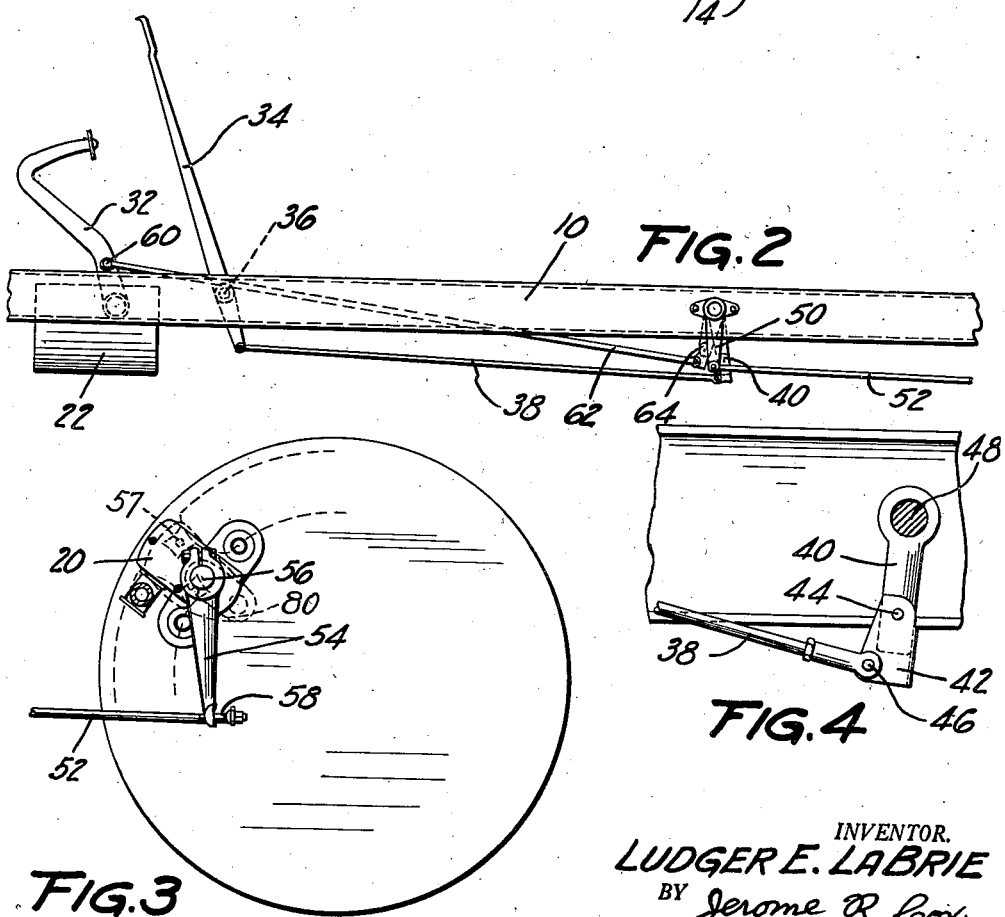
INVENTOR.
LUDGER E. LaBRIE
BY Jerome R. Cox
ATTORNEY July 9, 1940. L. E. LA BRIE 2,207,126
BRAKE
Filed July 12, 1935 2 Sheets-Sheet 2

INVENTOR.
LUDGER E. LA BRIE
BY Jerome R. Cox
ATTORNEY

Patented July 9, 1940

2,207,126

UNITED STATES PATENT OFFICE 2,207,126

BRAKE

Ludger E. La Brie, South Bend, Ind., assignor to Bendix Products Corporation, South Bend, Ind., a corporation of Indiana Application July 12, 1935, Serial No. 30,960

6 Claims. (Cl. 188—106)

This invention relates to brakes, and especially to a braking system in which hydraulic actuation is used and in which mechanical means are provided for safety in the event that anything happens to the hydraulic actuation.

Hydraulic actuation of brakes has become increasingly popular due to the low friction losses and to the automatic equalization of brake applying forces possible with this type of actuation. There are large numbers of people, however, who do not feel safe with hydraulic brakes on account of the fact that a failure of any part of the system causes the operator to be left without brakes except through the parking or emergency lever. In case of such a failure, it often happens that the time available for averting an accident is insufficient for the operator to realize his difficulty and reach for and apply the brakes through the emergency lever.

I have provided a system for braking in which all of the advantages of the hydraulic system are retained, and also the operator retains all of the safety features of mechanically actuated braking systems.

One of the objects of this invention is therefore to provide an efficient, safe, hydraulic braking system.

A further object of the invention is to attain this safety with hydraulic brakes through a minimum of expense.

A feature of this invention involves a connection between the foot pedal, normally used for operating the hydraulic brakes, and the cross shaft, normally used for applying the brakes mechanically through the emergency or hand lever.

Further features and objects of the invention will be apparent after a reading of the subjoined specification and claims and after a consideration of the accompanying drawings, in which:

Figure 1 is a plan view, largely diagrammatic, of the chassis of an automobile equipped with my improved braking system;

Figure 2 is a view, in elevation, of a part of the braking system shown in Figure 1;

Figure 3 is a view, in side elevation, of one of the rear brakes of the system shown in Figure 1;

Figure 4 is a fragmentary view, in side elevation, of an overrunning connection;

Figure 5:
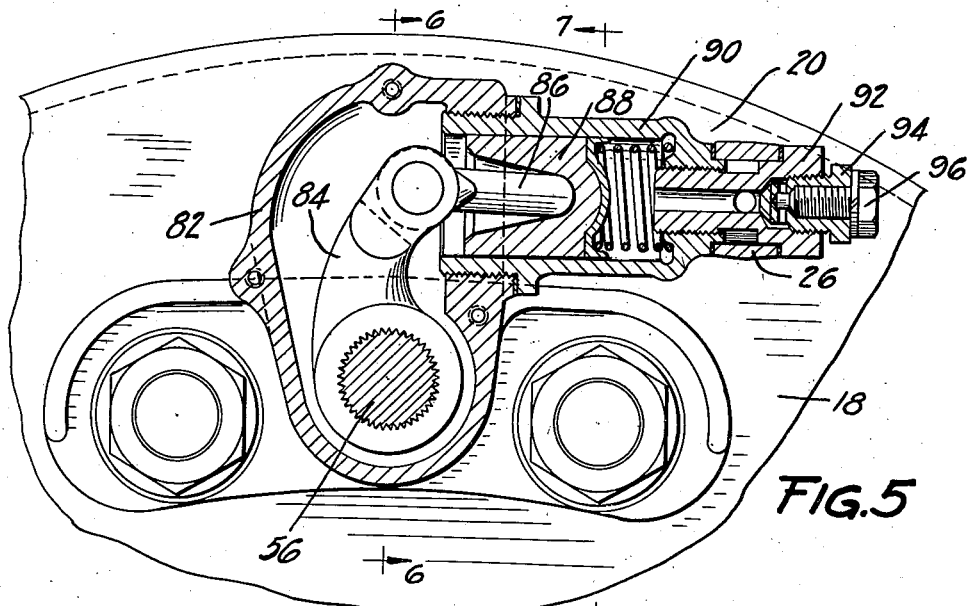
Figures 6, 7:
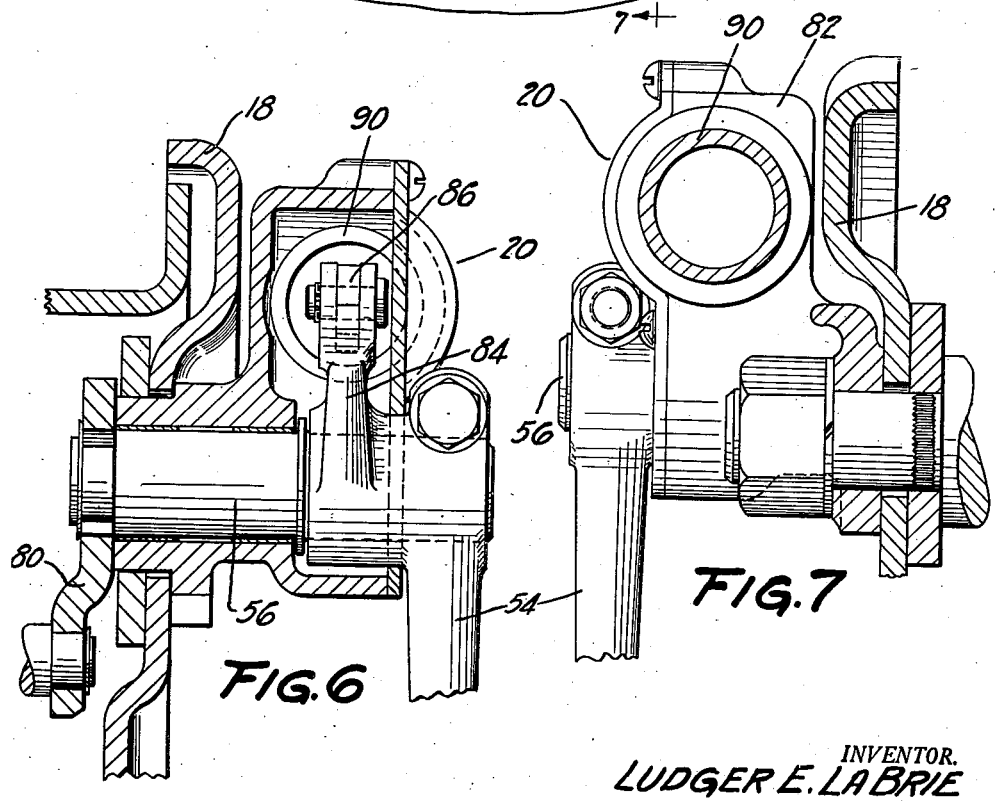

Figure 5 is a section, in a plane paralleling the backing plate, through the wheel cylinder and associated parts; and Figures 6 and 7 are sections therethrough on the lines 6—6 and 7—7 of Figure 5 respectively.

Referring in detail to the drawings, I have shown in Figure 1 a chassis 10 of an automobile equipped with forward wheels 12 and rear wheels 14. The wheels 12 and 14 are provided with brakes 16 and 18 respectively. The brakes may be of any desired type, as for example those described in my prior Patent No. 1,967,412, granted July 24, 1934. Each of these brakes is adapted to be actuated by a wheel cylinder 20 shown in detail in Figures 5–7.

Means are provided for supplying pressure to each of the wheel cylinders 20, and include a master cylinder 22 connected by conduits 24, 26, 28 and 30 with the wheel cylinders. A piston in the master cylinder 22 is arranged to be operated by a foot pedal 32 in a well-known manner. Thus actuation of the foot pedal 32 moves the piston and applies pressure to the fluid in the lines 24, 26, 28 and 30 and in the wheel cylinders 20, thus applying the brakes 16 and 18.

I also provide mechanical means for applying the brakes 18. This mechanical means includes a hand parking or emergency lever 34 pivoted upon a stationary pivot 36 on the chassis 10 of the automobile. The lower end of the lever 34 is connected by a link 38 with a lever 40 by means of a pocketbook connection comprising a U-shaped member 42 pivoted at 44 on the lever 40 and pivotally connected at 46 to the link 38. The lever 40 is secured to a cross shaft 48, which has at its opposite ends levers 50. The levers 50 are connected by links 52 with levers 54 secured to cam shafts 56 arranged to operate cams 80 to spread the friction members of the brakes 18. Thus operation of the hand lever 34 rotates the cross shaft 48, and through the links 52 and the cams on the cam shafts 56 may apply the brakes mechanically. It is to be noted that the connection 58 between the link 52 and the lever 54 allows a slight amount of lost motion so that the first part of the movement of the hand lever 34 and the first part of the rotation of the cross shaft 48 does not begin to apply the brakes, but only after this lost motion is taken up are the brakes applied through the hand lever.

I also provide means so that it is unnecessary for the operator to remember to apply the brakes through his emergency lever 34 in the event of failure of the hydraulic actuation. Secured to the foot pedal 32 pivotally as at 60 is a link 62 pivotally connected to a lever 64 in the same manner that the link 38 is connected to the lever 40. Thus, in the event of failure of the hydraulic actuation system, the foot pedal is arranged to apply the brakes mechanically through the link 62, the cross shaft 48, the links 52, the levers 54 and the cams attached to the cam shafts 56. However, it is to be particularly noticed that normal application of force to the foot pedal 32 applies the brake hydraulically, inasmuch as the lost motion at 58 prevents the mechanical connections from actuating the brakes. Thus there is in normal operation substantially no tension exerted on the mechanical hookup.

It is believed that the operation of my improved braking system will be apparent from the above description. Normally in service braking the operator applies force to the pedal 32, actuating a piston in the master cylinder 22 and forcing fluid under pressure to the wheel cylinders 20, thus applying all of the brakes equally and efficiently on account of the minimum losses due to friction. In the event of failure of the hydraulic system, the pedal acts through the link 62, the lever 64, the cross shaft 48, the links 52, the levers 54 and the cams attached to the cam shafts 56. During service braking by means of the pedal normally there is no movement of the hand lever 34 and the link 38 on account of the pocketbook connection at 40, 42, 44. When it is desired to apply the brakes for parking, the hand lever 34 is operated and operates through the link 48, the connection 40, the cross shaft 48, the links 52, the levers 54, the cam shaft 56 to similarly apply the brakes. In operation of the brakes by the hand lever, however, the pedal 32 and the link 62 are not moved in view of the pocketbook connection at 64.

The details of the operating mechanism for the rear brakes, in one embodiment, are shown in Figures 5, 6 and 7. In this embodiment, the shaft 56 operates a cam device 80 described in my said Patent No. 1,967,412, to apply the brake. The shaft 56 has the above-described arm 54 secured to its end, outside of a two-piece housing 82 inclosing an arm 84 secured on the shaft and pivotally connected to a thrust rod 86 rounded at its end to seat in a recess in the base of a piston 88.

The piston 88 is arranged in a cylinder 90 shown screwed into a corresponding opening in the housing 82. The housing 82 is shown formed with a bearing for the shaft 56. A fitting 92 at the end of the cylinder 90, having a removable bleeder plug 94, serves to connect the cylinder to the hydraulic line 26 or 30. The bleeder plug 94 has a removable sealing screw 96 which is taken out in bleeding the line, whereupon the plug 94 can be backed off a turn or two to permit the liquid in the lines to bleed through openings formed in it.

It is to be understood that the above-described embodiment of my invention is for the purpose of illustration only and various changes may be made therein without departing from the spirit and scope of the invention.

I claim:

1. A braking system comprising a backing plate, a wheel brake, a housing secured to said backing plate and having a shaft journaled therein and extending through the housing, an arm secured to said shaft within the housing, a cylinder secured at one end to the wall of the housing in line with the end of said arm, a piston in the cylinder arranged to operate said arm, a lever on said shaft outside of the housing and inside of the backing plate for actuating said wheel brake, and mechanical operating means connected to the shaft outside the housing.

2. A braking system comprising a backing plate, a wheel brake, a housing secured to said backing plate and having a shaft journaled therein and extending through the housing, an arm secured to said shaft within the housing, a cylinder, a piston in the cylinder arranged to operate said arm, a lever on said shaft outside of the housing and inside of the backing plate for actuating said wheel brake, and mechanical operating means connected to the shaft outside of the housing and outside of the backing plate.

3. In a hydraulic braking system, wheel brakes, a master cylinder, wheel cylinders, means for connecting said master cylinder and said wheel cylinders, a foot pedal operating the master cylinder, and additional means operated by said foot pedal for operating said brakes comprising a cross shaft, a link connected to said foot pedal, an overrunning connection between said link and said cross shaft, and connections between said cross shaft and said brakes in which connections there is interposed a lost motion connection whereby said additional means for applying the brakes is normally ineffective to exert brake applying pressure, but becomes effective immediately after a failure of the hydraulic braking system.

4. In a haydraulic braking system, wheel brakes, a master cylinder, wheel cylinders, means for connecting said master cylinder and said wheel cylinders, a foot pedal operating the master cylinder, and additional means operated by said foot pedal for operating said brakes comprising a cross shaft, a link connected to said foot pedal, an overrunning connection between said link and said cross shaft, and connections between said cross shaft and said brakes in which connections there is interposed a lost motion connection whereby said additional means for applying the brakes is normally ineffective to exert brake applying pressure, but becomes effective immediately after a failure of the hydraulic braking system, further characterized in that there is provided a hand lever connected to said cross shaft by an overrunning connection.

5. A braking system comprising a backing plate formed with an opening, a wheel brake, a housing having a sleeve portion extending through said opening and secured to the backing plate, a shaft journalled in said sleeve portion and extending through the housing, an arm secured to the shaft within the housing, a cylinder secured at one end to the wall of the housing in line with the end of said arm, a piston in the cylinder arranged to operate said arm, a lever on said shaft outside of the housing and inside of the backing plate for actuating said wheel brakes, and mechanical operating means connected to the shaft outside the housing.

6. In a brake mechanism for vehicles, a pair of road wheels, a pair of brakes for said road wheels, a foot actuated control member having a predetermined normal range of motion for actuating said brakes, a second pair of road wheels spaced longitudinally of said vehicle from said first named pair of road wheels, a second pair of brakes for said second pair of wheels, an operating element for actuating said second pair of brakes, a hand lever for normally transmitting brake applying motion to said element, and mechanical connections between said hand lever and operating element and said foot actuated control member and operating element operative to permit normal actuation of the second pair of brakes by the hand lever independent of the foot actuated control member and to permit actuation independent of the hand lever of the said operating element on a movement of said control member beyond its predetermined normal range of motion.

LUDGER E. LA BRIE.